US012373255B2

(12) United States Patent
Branover et al.

(10) Patent No.: US 12,373,255 B2
(45) Date of Patent: Jul. 29, 2025

(54) SYSTEMS AND METHODS FOR SHARING MEMORY ACROSS CLUSTERS OF DIRECTLY CONNECTED NODES

(71) Applicant: Advanced Micro Devices, Inc., Santa Clara, CA (US)

(72) Inventors: Alexander J. Branover, Boxborough, MA (US); Mahesh UdayKumar Wagh, Bellevue, WA (US); Francisco L. Duran, Austin, TX (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 13 days.

(21) Appl. No.: 18/091,681

(22) Filed: Dec. 30, 2022

(65) Prior Publication Data

US 2024/0220320 A1 Jul. 4, 2024

(51) Int. Cl.
  *G06F 12/00* (2006.01)
  *G06F 9/50* (2006.01)
  *G06F 9/54* (2006.01)

(52) U.S. Cl.
  CPC ............ *G06F 9/5016* (2013.01); *G06F 9/544* (2013.01)

(58) Field of Classification Search
  CPC ............................... G06F 9/5016; G06F 9/544
  See application file for complete search history.

(56) References Cited

U.S. PATENT DOCUMENTS

| 4,542,458 A * | 9/1985 | Kitajima | G06F 9/5016 |
| | | | 710/18 |
| 7,240,179 B1 * | 7/2007 | Treichler | G06F 12/023 |
| | | | 711/202 |
| 9,652,393 B1 * | 5/2017 | Kang | G06F 9/5016 |
| 11,119,553 B2 * | 9/2021 | Truong | G06F 11/3062 |
| 2003/0063500 A1 * | 4/2003 | Naso | G11C 29/12 |
| | | | 365/200 |
| 2003/0159010 A1 * | 8/2003 | Bryborn | B29C 45/14311 |
| | | | 711/159 |
| 2008/0007791 A1 * | 1/2008 | Nagarajan | H04N 1/4413 |
| | | | 358/402 |
| 2008/0082780 A1 * | 4/2008 | Tsuji | G06F 12/0653 |
| | | | 711/E12.001 |
| 2009/0063880 A1 * | 3/2009 | Arimilli | G06F 9/5088 |
| | | | 713/320 |

(Continued)

OTHER PUBLICATIONS

International Search Report and Written Opinion from corresponding International Application No. PCT/US2023/086182, dated May 16, 2024 (10 pages).

*Primary Examiner* — Tim T Vo
*Assistant Examiner* — Mohammad S Hasan
(74) *Attorney, Agent, or Firm* — Greenberg Traurig, LLP

(57) ABSTRACT

An exemplary system comprises a cluster of nodes that are communicatively coupled to one another via at least one direct link and collectively include a plurality of memory devices. The exemplary system also comprises at least one system memory manager communicatively coupled to the cluster of nodes. In one example, the system memory manager is configured to allocate a plurality of sharable memory pools across the memory devices. Various other systems, methods, and computer-readable media are also disclosed.

18 Claims, 6 Drawing Sheets

(56) References Cited

U.S. PATENT DOCUMENTS

| | | | |
|---|---|---|---|
| 2009/0119498 A1* | 5/2009 | Narayanan | G06F 12/0875 |
| | | | 713/2 |
| 2009/0154254 A1* | 6/2009 | Wong | G06F 12/0246 |
| | | | 711/E12.001 |
| 2010/0177547 A1* | 7/2010 | Shen | G11C 17/18 |
| | | | 365/230.01 |
| 2013/0089104 A1* | 4/2013 | Davis | H04L 45/74 |
| | | | 370/401 |
| 2013/0151569 A1* | 6/2013 | Therien | G06F 11/3698 |
| | | | 707/803 |
| 2015/0269179 A1* | 9/2015 | McClements | G06F 16/24552 |
| | | | 711/130 |
| 2016/0011992 A1* | 1/2016 | Sandoz | G06F 9/45504 |
| | | | 711/163 |
| 2016/0283399 A1 | 9/2016 | Das Sharma | |
| 2017/0068639 A1* | 3/2017 | Davis | H04L 49/109 |
| 2018/0052765 A1* | 2/2018 | Imbierski | G06F 3/0644 |
| 2019/0087229 A1* | 3/2019 | Iuliano | G06F 9/5022 |
| 2019/0108064 A1* | 4/2019 | Stafford | H04L 67/1012 |
| 2019/0171580 A1* | 6/2019 | Suryanarayana | G06F 12/0238 |
| 2020/0202027 A1* | 6/2020 | Chan | G06V 10/955 |
| 2020/0218599 A1* | 7/2020 | Elliott | G06F 3/0679 |
| 2020/0341786 A1* | 10/2020 | Soryal | G06F 9/5077 |
| 2020/0371692 A1 | 11/2020 | Van Doorn et al. | |
| 2021/0081312 A1 | 3/2021 | Coury et al. | |
| 2021/0406056 A1* | 12/2021 | Shanbhogue | G06F 9/5016 |
| 2022/0066827 A1 | 3/2022 | Tavallaei et al. | |
| 2022/0121386 A1 | 4/2022 | Hsu et al. | |
| 2022/0300356 A1* | 9/2022 | Wu | G06F 9/544 |
| 2023/0130426 A1* | 4/2023 | Chao | G06F 11/2043 |
| | | | 711/162 |
| 2023/0367476 A1* | 11/2023 | Kuyel | G06F 3/0607 |
| 2023/0385103 A1* | 11/2023 | Zheng | G06F 9/541 |

\* cited by examiner

SYSTEMS AND METHODS FOR SHARING MEMORY ACROSS CLUSTERS OF DIRECTLY CONNECTED NODES

BACKGROUND

Memory is often one of the most expensive resources across data fabrics and/or node clusters. The expansion of memory resources across data fabrics and/or node clusters could provide, support, and/or facilitate a number of improvements and/or advantages, such as increased performance, expansion of service provisioning, and/or additional storage potential. Unfortunately, the cost of the memory hardware necessary to do so is often prohibitive and/or imprudent. The instant disclosure, therefore, identifies and addresses a need for additional and improved systems and methods that facilitate the benefits of memory expansion without the prohibitive hardware costs.

BRIEF DESCRIPTION OF THE DRAWINGS

The accompanying drawings illustrate a number of exemplary implementations and are a part of the specification. Together with the following description, these drawings demonstrate and explain various principles of the instant disclosure.

Figure 1:
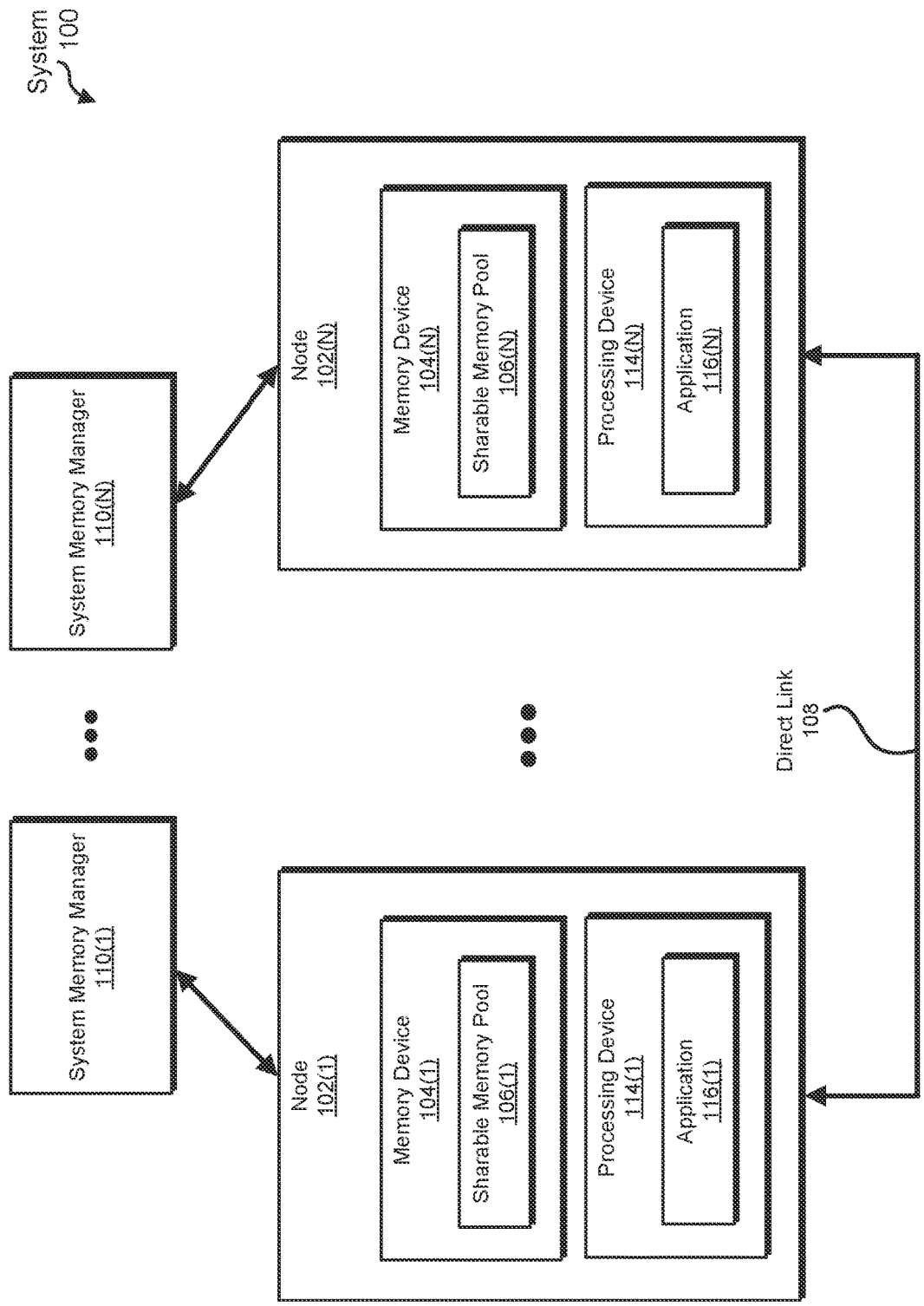
FIG. 1 is an illustration of an exemplary system for sharing memory across clusters of directly connected nodes according to one or more implementations of this disclosure.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the instant disclosure covers all modifications, equivalents, and alternatives falling within the scope of the appended claims.

DETAILED DESCRIPTION OF EXEMPLARY IMPLEMENTATIONS

The present disclosure describes various apparatuses, systems, and methods for sharing memory across clusters of directly connected nodes. As will be described in greater detail below, multiple nodes can be clustered together via direct connections to one another. In some examples, the cluster of nodes implements a memory lending and/or borrowing scheme that accommodates and/or normalizes the disparate workloads of the nodes across the memory resources of the cluster of nodes. For example, one or more of the clustered nodes can share and/or pool chunks of memory for use and/or access by other nodes in the cluster.

In some examples, upon bootup, each node scans its local memory ranges and broadcasts those memory ranges to the other nodes in the cluster. In one example, each node deploys and/or implements a system memory manager that builds a memory map based on those broadcasted memory ranges in support of sharable memory pools distributed across the cluster. In this example, each node's system memory manager and/or pool manager can request to add data to, remove data from, and/or access data in the shared memory pools distributed across the cluster. This memory lending and/or borrowing scheme can enable some nodes to leverage underutilized and/or available memory located on other nodes via the memory map. Under this scheme, the loaned and/or borrowed memory can appear the same as local memory to each of the clustered nodes.

In some examples, a system comprises a cluster of nodes that are communicatively coupled to one another via at least one direct link and collectively include a plurality of memory devices. In such examples, the system also comprises at least one system memory manager communicatively coupled to the cluster of nodes. In one example, the system memory manager is configured to allocate a plurality of sharable memory pools across the memory devices.

In some examples, the system memory manager is configured to identify workloads of the nodes and/or allocate the sharable memory pools across the memory devices based at least in part on the workloads of the nodes. Additionally or alternatively, the system memory manager is configured to reserve at least a portion of the sharable memory pools for exclusive use by a first node included in the nodes.

In some examples, a first node included in the nodes hosts a sharable memory pool included in the sharable memory pools. In such examples, a second node included in the nodes is configured to access, via the direct link, at least a portion of the sharable memory pool in connection with at least one application running on the second node due at least in part to the second node being authorized to use the portion of the sharable memory pool. In one example, a third node included in the nodes is configured to access the sharable memory pool in connection with an additional application running on the third node.

In some examples, a third node included in the nodes hosts an additional sharable memory pool included in the sharable memory pools. In such examples, the second node is configured to access at least a portion of the additional sharable memory pool in connection with the application running on the second node due at least in part to the second node being authorized to use the portion of the additional sharable memory pool.

In some examples, the system memory manager is configured to generate at least one memory map that includes address ranges corresponding to the sharable memory pools to enable the nodes to access the sharable memory pools. In one example, the nodes each include private local memory that is inaccessible to one another. In this example, the system memory manager is configured to generate the memory map to include an address range corresponding to the private local memory normalized across the nodes.

In some examples, the direct link that communicatively couples the nodes to one another comprises a physical communication link that excludes switches between the nodes. In one example, the system memory manager is configured to receive a memory management request from a remote device. In this example, the system memory manager is also configured to increase or decrease the amount of memory that is allocated to at least one of the sharable memory pools in response to the memory management request.

In some examples, the system memory manager is configured to detect an addition of at least one memory device to the plurality of memory devices during operation of the nodes. Additionally or alternatively, the system memory manager is configured to detect a removal of at least one memory device from the plurality of memory devices during operation of the nodes. In one example, the system memory manager is configured to reallocate the sharable memory pools across the memory devices to account for the addition or removal of the memory device during operation of the nodes. In another example, the system memory manager is configured to detect the addition or removal of the memory device via an advanced configuration and power interface (ACPI).

In some examples, the nodes comprise security processors that implement memory fencing across the sharable memory pools to ensure that unauthorized attempts to access any of the sharable memory pools are denied. In one example, the system memory manager comprises a plurality of system memory controllers that are implemented by the nodes and communicate with one another to coordinate the allocation of the sharable memory pools.

In some examples, the nodes scan the memory devices for address ranges to broadcast to one another. In such examples, the nodes build memory maps based at least in part on the address ranges broadcasted to one another. In one example, the system memory manager is centralized to manage the sharable memory pools.

In some examples, a method comprises identifying, by at least one system memory manager, ranges of memory addresses across a plurality of memory devices corresponding to a cluster of nodes. In such examples, the method comprises allocating, by the system memory manager, a plurality of sharable memory pools across the memory devices based at least in part on the ranges of memory addresses. Additionally or alternatively, the method comprises enabling, by the system memory manager, a remote node included in the nodes to access a portion of the sharable memory pools hosted by a local node included in the nodes due at least in part to the remote node being authorized to use the portion of the sharable memory pools.

In some examples, the method also comprises identifying, by the system memory manager, workloads of the nodes. In such examples, the method further comprises allocating the sharable memory pools based at least in part on the workloads of the nodes. In one example, the method additionally comprises denying, by the system memory manager, at least one node included in the nodes access to the portion of the sharable memory pools hosted by the local node due at least in part to the node being unauthorized to use the portion of the sharable memory pools.

In some examples, a non-transitory computer-readable medium comprises one or more computer-executable instructions. In such examples, when executed by at least one processing device that implements at least one system memory manager, the computer-executable instructions cause the system memory manager to identify ranges of memory addresses across a plurality of memory devices corresponding to a cluster of nodes. In one example, the computer-executable instructions also cause the system memory manager to allocate a plurality of sharable memory pools across the memory devices based at least in part on the ranges of memory addresses. In this example, the computer-executable instructions further cause the system memory manager to enable a remote node included in the nodes to access a portion of the sharable memory pools hosted by a local node included in the nodes due at least in part to the remote node being authorized to use the portion of the sharable memory pools.

The following will provide, with reference to FIGS. 1-5, detailed descriptions of exemplary devices, systems, components, and/or corresponding implementations for sharing memory across clusters of directly connected nodes. Detailed descriptions of an exemplary method for sharing memory across clusters of directly connected nodes will be provided in connection with FIG. 6.

FIG. 1 illustrates an exemplary system 100 that includes and/or represents a cluster of nodes 102(1)-(N) and/or one or more system memory managers 110(1)-(N). In some examples, nodes 102(1)-(N) are communicatively coupled to one another via at least one direct link 108. In such examples, nodes 102(1)-(N) include and/or are attached to memory devices 104(1)-(N), respectively. In one example, system memory managers 110(1)-(N) are communicatively coupled to the cluster of nodes 102(1)-(N). In this example, system memory managers 110(1)-(N) allocate, designate, and/or distribute sharable memory pools 106(1)-(N) across memory devices 104(1)-(N).

In some examples, nodes 102(1)-(N) also include and/or are attached to processing devices 114(1)-(N), respectively. In such examples, processing devices 114(1)-(N) execute and/or launch applications 116(1)-(N), respectively.

In some examples, nodes 102(1)-(N) can each include and/or represent any type or form of computing device capable of performing computing tasks, facilitating communications, and/or sharing memory with other nodes in a cluster configuration. Examples of nodes 102(1)-(N) each include, without limitation, network devices, servers, routers, switches, data fabric devices, data centers, host devices, client devices, laptops, tablets, desktops, personal computers, cellular phones, Personal Digital Assistants (PDAs), multimedia players, embedded systems, wearable devices (e.g., smart watches, smart glasses, etc.), gaming consoles, hubs, modems, bridges, repeaters, gateways, variations or combinations of one or more of the same, portions of one or more of the same, and/or any other suitable nodes.

In some examples, memory devices 104(1)-(N) can each include and/or represent any type or form of storage device that maintains, stores, holds, and/or buffers data in connection with one or more applications and/or features installed and/or running on one or more nodes. For example, memory devices 104(1)-(N) can each include and/or represent a volatile and/or non-volatile storage and/or medium capable of storing data and/or computer-readable instructions. In one example, memory devices 104(1)-(N) facilitate, support, and/or implement Compute Express Link (CXL) connections and/or interfaces for accessing and/or sharing data across nodes 102(1)-(N). In certain implementations, each of memory devices 104(1)-(N) constitutes and/or represents a plurality of discrete memory devices and/or components. Examples of memory devices 104(1)-(N) include, without limitation, random access memory (RAM) devices, dynamic RAM (DRAM) devices, read only memory (ROM) devices, flash memory devices, hard disk drives (HDDs), solid-state drives (SSDs), CXL-compatible memory devices, optical disk drives, caches, main memory, variations or combinations of one or more of the same, portions of one or more of the same, and/or any other suitable memory devices.

In some examples, memory devices 104(1)-(N) include and/or represent ranges of private and/or local-only memory in addition to sharable memory pools 106(1)-(N). In such examples, the private and/or local-only memory ranges are accessible to the corresponding node and/or inaccessible to remote nodes. For example, node 102(1) can access data in private local memory aboard memory device 104(1) but cannot access data in private local memory aboard memory device 104(N). Additionally or alternatively, node 102(N) can access data in private local memory aboard memory device 104(N) but cannot access data in private local memory aboard memory device 104(1). Accordingly, private local memory, system memory managers 110(1)-(N), and/or corresponding memory maps can be configured to prevent access from unauthorized guests and/or hypervisors.

In some examples, processing devices 114(1)-(N) can each include and/or represent any type or form of hardware-implemented device capable of interpreting and/or executing computer-readable instructions. Examples of processing devices 114(1)-(N) include, without limitation, central processing units (CPUs), graphics processing units (GPUs), parallel accelerated processors, microprocessors, multi-core processors, microcontrollers, field-programmable gate arrays (FPGAs), application-specific integrated circuits (ASICs), systems on chips (SoCs), variations or combinations of one or more of the same, portions of one or more of the same, and/or any other suitable processing devices.

In some examples, system memory managers 110(1)-(N) can each include and/or represent any type or form of controller capable of allocating sharable memory pools across memory devices in clustered nodes. In one example, system memory managers 110(1)-(N) can be integrated in and/or implemented by nodes 102(1)-(N) In this example, system memory managers 110(1)-(N) communicate with another to coordinate the allocation, release, expansion, and/or contraction of sharable memory pools 106(1)-(N). In another example, a single centralized system memory manager manages and/or coordinates the allocation, release, expansion, and/or contraction of sharable memory pools 106(1)-(N) across all of nodes 102(1)-(N). In certain implementations, system memory managers 110(1)-(N) of each node can include a baseboard management controller (BMC), a system firmware manager, and/or a system software manager.

In some examples, system memory managers 110(1)-(N) can include and/or represent one or more portions of hardware devices, firmware, and/or software. In one example, one or more of system memory managers 110(1)-(N) can be implemented as standalone computing devices. Additionally or alternatively, one or more of system memory managers 110(1)-(N) can be implemented by computing devices (e.g., nodes 102(1)-(N)) that perform additional computing tasks and/or communication operations.

In some examples, sharable memory pools 106(1)-(N) can each include and/or represent ranges of memory addresses that have been allocated for sharing across nodes 102(1)-(N) of the cluster. In one example, these ranges of memory addresses can constitute and/or represent allocations that nodes 102(1)-(N) are able to spare and/or share based at least in part on their respective workload requirements. In certain implementations, sharable memory pools 106(1)-(N) can include and/or represent a homogeneous distribution and/or amount of memory across memory devices 104(1)-(N). In other implementations, sharable memory pools 106(1)-(N) can include and/or represent a heterogeneous distribution and/or amount of memory.

In some examples, direct link 108 includes and/or represents a physical cable and/or connection between nodes 102(1) and 102(N). In one example, direct link 108 excludes and/or omits switches and/or intermediate devices between nodes 102(1) and 102(N). Examples of direct link 108 include, without limitation, fiber optic cables, Ethernet cables, coaxial cables, twisted pair cables, electrical cables, network cables, variations or combinations of one or more of the same, and/or any other suitable direct links.

In some examples, system memory managers 110(1)-(N) measure, determine, and/or identify workloads of nodes 102(1)-(N), memory devices 104(1)-(N), and/or processing devices 114(1)-(N). In these examples, the workloads can constitute and/or represent the amount of resources, processing, and/or time needed to perform one or more computing tasks scheduled on nodes 102(1)-(N). For example, the amount of memory needed to run one or more applications, processes, programs, and/or virtual machines on node 102(1) can contribute to and/or be accounted for in the workload of node 102(1). Additionally or alternatively, the amount of memory needed to run one or more applications, processes, programs, and/or virtual machines on node 102(N) can contribute to and/or be accounted for in the workload of node 102(N).

In some examples, the workload requirements of nodes 102(1)-(N) can account for and/or involve latency, bandwidth, memory capacity, and/or terminations of virtual machines or threads. In one example, system memory managers 110(1)-(N) allocate sharable memory pools 106(1)-(N) across memory devices 104(1)-(N) based at least in part on the workloads of nodes 102(1)-(N). In a specific example, the entire working set of a node's memory requirements can be implemented and/or placed in one or more of sharable memory pools 106(1)-(N).

In some examples, system memory managers 110(1)-(N) detect, discover, and/or are aware of topological changes (e.g., links in isolation, disconnections, and/or down states) within the cluster. Additionally or alternatively, system memory managers 110(1)-(N) initiate and/or perform updates on the memory mapping of nodes 102(1)-(N).

Figure 2:
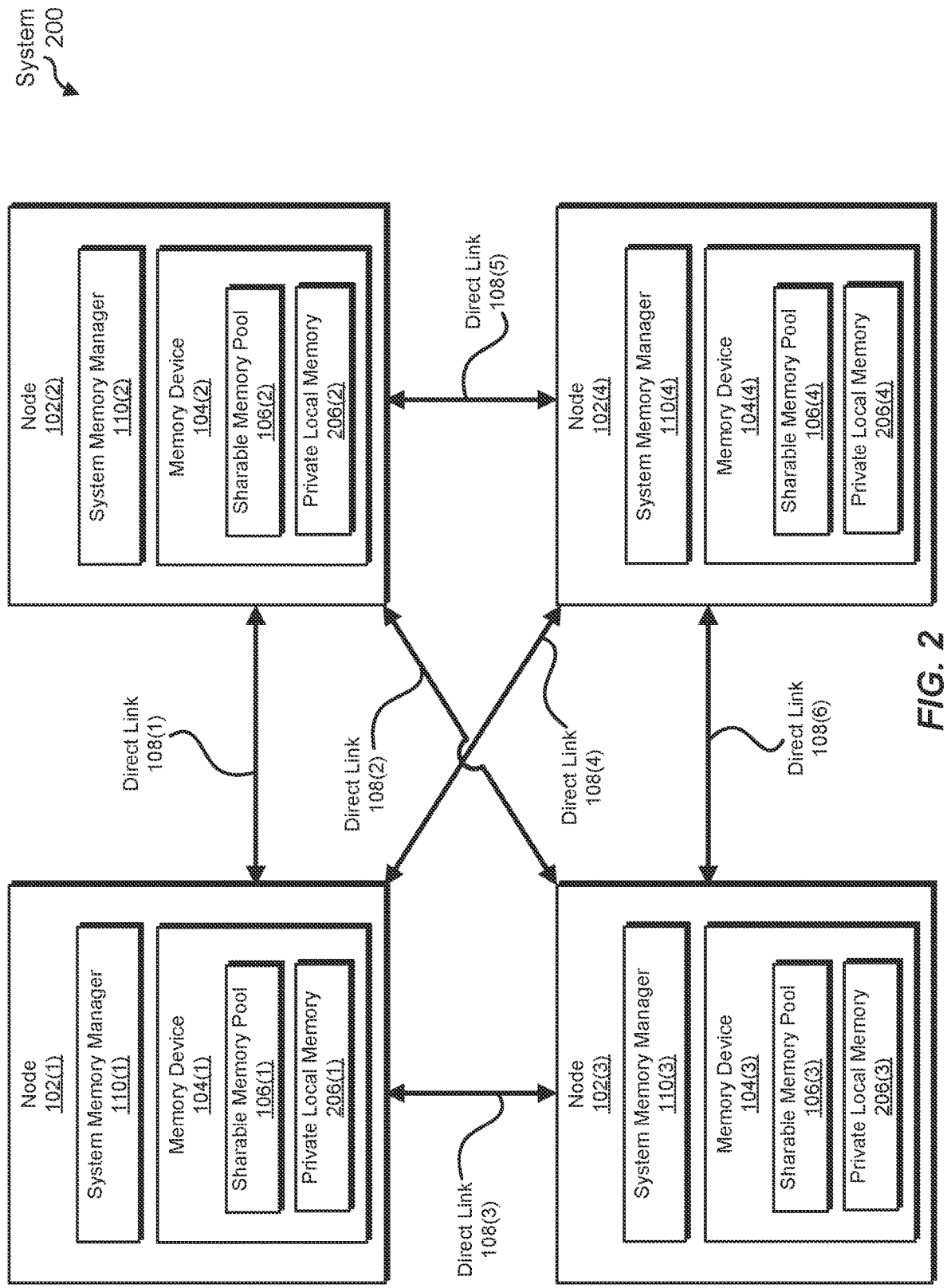
FIG. 2 is an illustration of an exemplary system for sharing memory across clusters of directly connected nodes according to one or more implementations of this disclosure.

FIG. 2 illustrates an exemplary system 200 that includes and/or represents a cluster of nodes 102(1), 102(2), 102(3), and 102(4) communicatively coupled to one another via direct links 108(1), 108(2), 108(3), 108(4), 108(5), and 108(6). In some examples, system 200 can include and/or represent certain components and/or features that perform and/or provide functionalities that are similar and/or identical to those described above in connection with FIG. 1. In one example, node 102(1) includes and/or represents memory device 104(1) and a system memory manager 110(1), and node 102(2) includes and/or represents a memory device 104(2) and a system memory manager 110(2). In this example, node 102(3) includes and/or represents a memory device 104(3) and a system memory manager 110(3), and node 102(4) includes and/or represents a memory device 104(4) and a system memory manager 110(4).

In some examples, memory device 104(1) includes and/or hosts sharable memory pool 106(1) and a private local memory 206(1), and memory device 104(2) includes and/or hosts a sharable memory pool 106(2) and a private local memory 206(2). In such examples, memory device 104(3) includes and/or hosts sharable memory pool 106(3) and a private local memory 206(3), and memory device 104(4) includes and/or hosts a sharable memory pool 106(4) and a private local memory 206(4).

In some examples, system memory managers 110(1)-(4) can reserve portions (e.g., certain address ranges) of sharable memory pools 106(1)-(4), respectively, for exclusive by one of nodes 102(1)-(4) and/or a corresponding application. For example, system memory managers 110(1)-(N) can provide, support, and/or facilitate memory fencing across sharable memory pools 106(1)-(4) to ensure that all attempts by unauthorized nodes and/or applications to access such portions of sharable memory pools 106(1)-(4) are denied. In one example, such access attempts can include and/or represent any type or form of read, write, and/or update operations. Additionally or alternatively, such access attempts can be performed in connection with one or more applications running on nodes 102(1)-(4).

In some examples, node 102(1) can access at least a portion of sharable memory pool 106(2) via direct link 108(1), at least a portion of sharable memory pool 106(3) via direct link 108(3), and/or at least a portion of sharable memory pool 106(4) via direct link 108(4). Additionally or alternatively, node 102(2) can access at least a portion of sharable memory pool 106(1) via direct link 108(1), at least a portion of sharable memory pool 106(3) via direct link 108(2), and/or at least a portion of sharable memory pool 106(4) via direct link 108(5).

In some examples, node 102(3) can access at least a portion of sharable memory pool 106(1) via direct link 108(3), at least a portion of sharable memory pool 106(2) via direct link 108(2), and/or at least a portion of sharable memory pool 106(4) via direct link 108(6). Additionally or alternatively, node 102(4) can access at least a portion of sharable memory pool 106(1) via direct link 108(4), at least a portion of sharable memory pool 106(2) via direct link 108(5), and/or at least a portion of sharable memory pool 106(3) via direct link 108(6).

In some examples, if memory fencing is implemented, successful access attempts made on sharable memory pools 106(1)-(4) can occur and/or result due at least in part to the node being authorized to use that portion of sharable memory pools 106(1)-(4). In one example, portions within each of sharable memory pools 106(1)-(4) can be allocated for use by specific nodes and/or restricted from use by specific nodes. For example, nodes 102(1) and 102(2) can be authorized to access one or more portions of sharable memory pools 106(1)-(4) that are inaccessible to nodes 102(3) and 102(4).

In some examples, system memory managers 110(1)-(4) generate, create, and/or build memory maps that include address ranges corresponding to sharable memory pools 106(1)-(4) and/or an address range corresponding to the private local memory of the node at issue. For example, nodes 102(1)-(4) and/or system memory managers 110(1)-(4) scan memory devices 104(1)-(4), respectively, for address ranges to broadcast to one another for the purpose of building corresponding memory maps and/or allocating address ranges for sharable memory pools 106(1)-(4). In this example, nodes 102(1)-(4) and/or system memory managers 110(1)-(4) receive the broadcasted memory ranges and then build their own memory maps that coincide with one another. These memory maps can appear identical to one another with respect to the addresses for shared memory pools and private local memory, but the addresses for the private local memory in each memory map would correspond to only the node and/or memory device at issue.

As a specific example, system memory managers 110(1)-(4) can generate, create, and/or build memory maps that include address ranges corresponding to sharable memory pools 106(1)-(4) to enable nodes 102(1)-(4) to access sharable memory pools 106(1)-(4). In this example, the address ranges are statically partitioned across nodes 102(1)-(N). In addition, these memory maps can each include and/or represent an address range corresponding to the private local memory. In one example, the address range corresponding to the private local memory is normalized to zero for each memory map in the cluster. Accordingly, the private local memory can begin at the same memory address (e.g., zero) in each memory map for nodes 102(1)-(N).

In some examples, one or more of system memory managers 110(1)-(4) can receive a memory management request from a remote device (e.g., a device outside the cluster). In one example, one or more of system memory managers 110(1)-(4) can increase and/or decrease the amount of memory that is allocated to sharable memory pools 106(1)-(4) in response to the memory management request.

Additionally or alternatively, one or more of system memory managers 110(1)-(4) can detect and/or discover the addition of a new memory device to the cluster during operation or bootup of one or more of nodes 102(1)-(4). Similarly, one or more of system memory managers 110(1)-(4) can detect and/or discover the removal of one of memory devices 104(1)-(4) from the cluster during operation or bootup of one or more of nodes 102(1)-(4). In one example, one or more of system memory managers 110(1)-(4) can detect and/or discover the addition or removal of a memory device via an advanced configuration and power interface (ACPI). In some implementations, one or more of system memory managers 110(1)-(4) can reallocate the sharable memory pools across the memory devices to account for the addition or removal of a memory device during operation or bootup of one or more of nodes 102(1)-(4).

Figure 3:
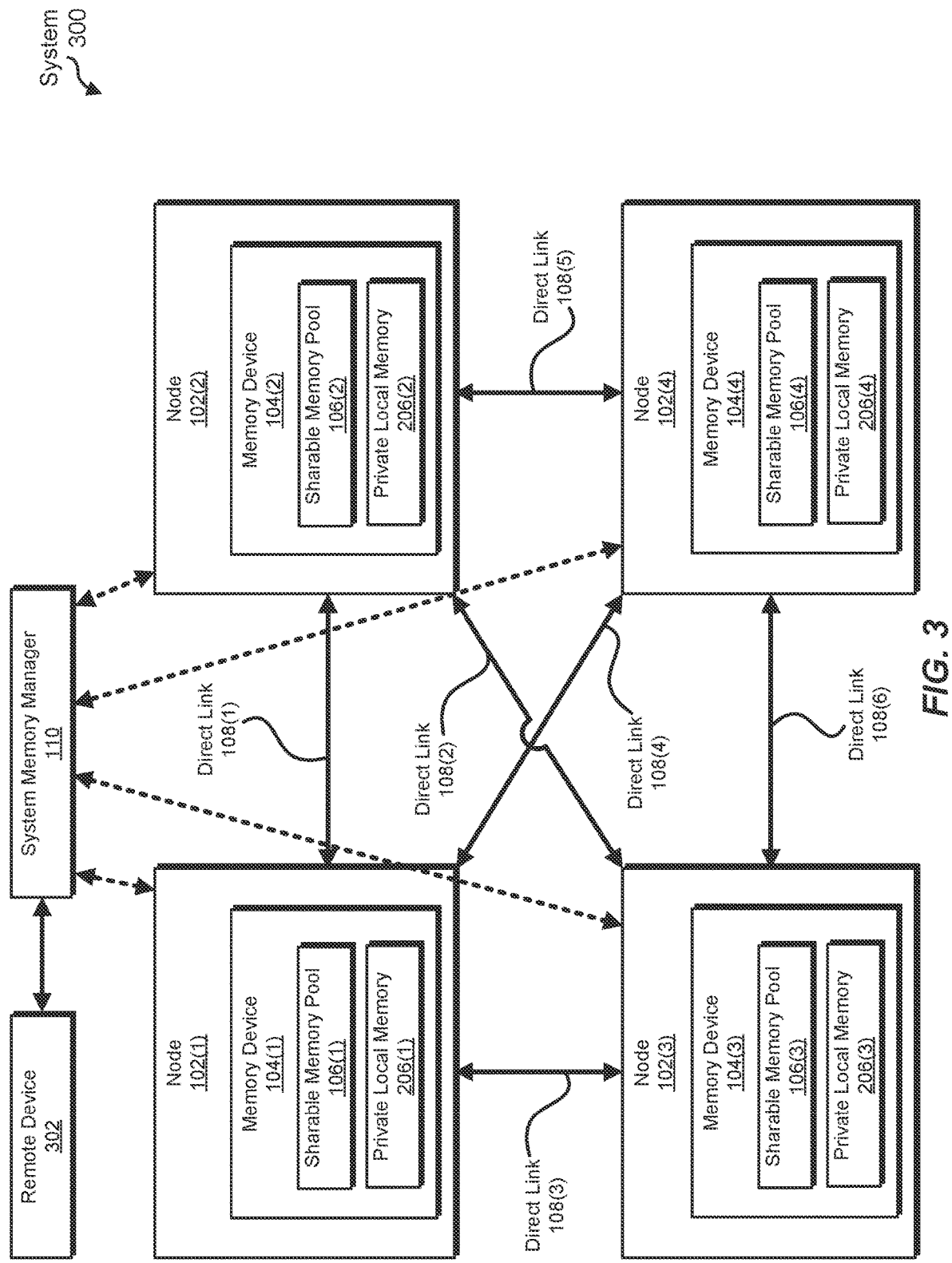
FIG. 3 is an illustration of an exemplary system for sharing memory across clusters of directly connected nodes according to one or more implementations of this disclosure.

FIG. 3 illustrates an exemplary system 300 that includes and/or represents a cluster of nodes 102(1)-(4) communicatively coupled to one another via direct links 108(1)-(6). In some examples, system 300 can include and/or represent certain components and/or features that perform and/or provide functionalities that are similar and/or identical to those described above in connection with either of FIGS. 1 and 2. In one example, system 300 includes and/or represents a system memory manager 110 that is communicatively coupled to nodes 102(1)-(4). In this example, instead of each node implementing its own system memory manager, system memory manager 110 serves as a single centralized unit that manages, allocates, and/or releases sharable memory pools 106(1)-(4) for the entire cluster. In certain implementations, system memory manager 110 can issue and/or send Intelligent Platform Management Interface (IPMI) requests to set up the cluster's shared memory configuration and/or facilitate distribution of the allocations to nodes 102(1)-(4).

In some examples, system memory manager 110 generates, creates, and/or builds a memory map that include address ranges corresponding to sharable memory pools 106(1)-(4) and/or an address range corresponding to the private local memory of nodes 102(1)-(4). For example, nodes 102(1)-(4) and/or system memory managers 110 can scan memory devices 104(1)-(N) for address ranges used to build the corresponding memory map and/or allocate address ranges for sharable memory pools 106(1)-(4). In this example, system memory manager 110 compiles the memory ranges scanned from memory devices 104(1)-(4) and then builds the memory map for distribution to nodes 102(1)-(4). In one example, the same memory map is implemented, applied, and/or used by each of nodes 102(1)-(4). In this example, the addresses for the private local memory in the memory map correspond to only the node and/or memory device at issue.

In some examples, system memory manager 110 can receive a memory management request from a remote device 302. In such examples, system memory manager 110 in turn makes decisions about the system memory needs of each of the nodes. In one example, system memory manager 110 can increase and/or decrease the amount of memory that is allocated to sharable memory pools 106(1)-(4) in response to the memory management request.

Figure 4:
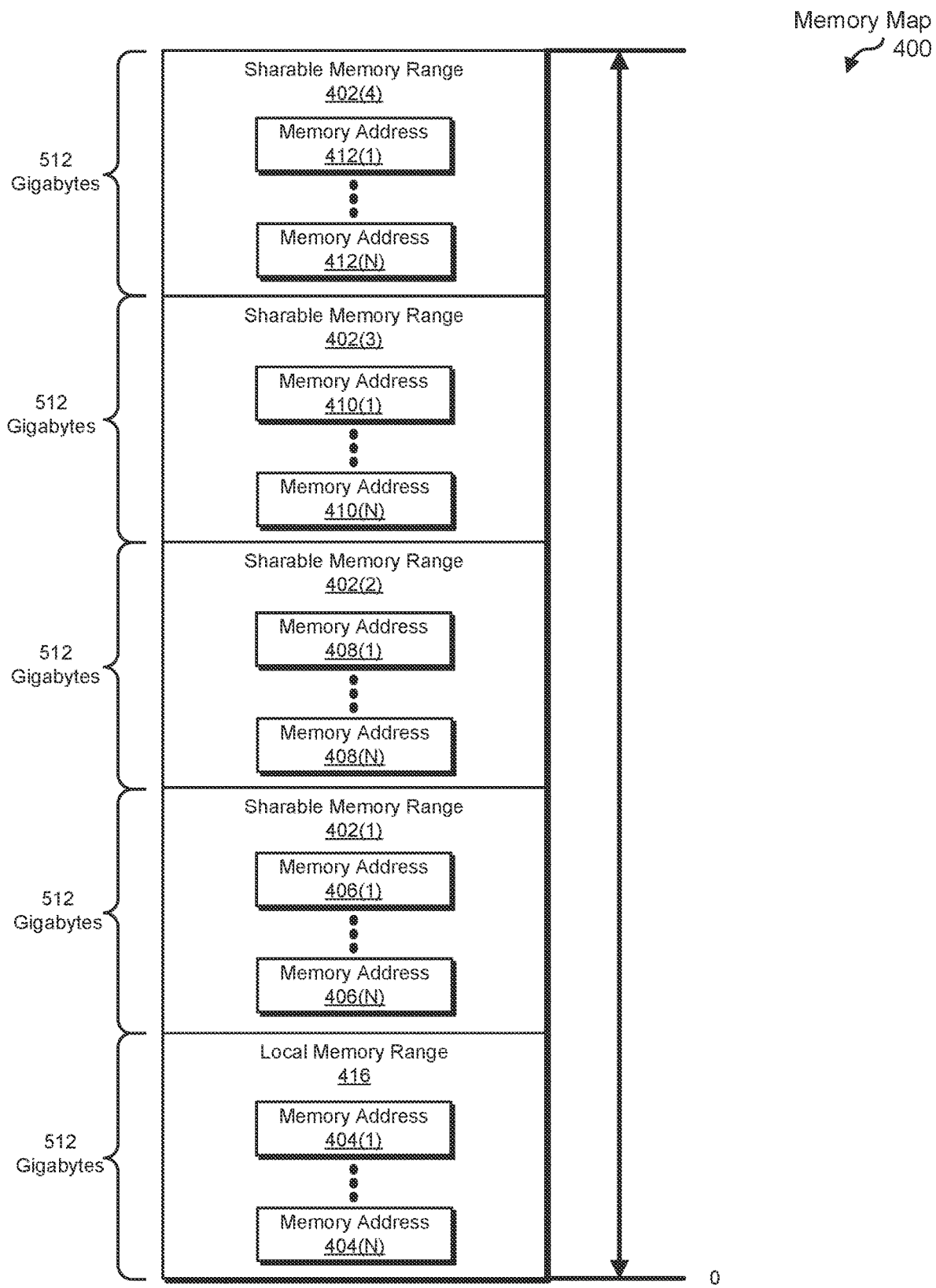
FIG. 4 is an illustration of an exemplary memory map that facilitates access to shared and/or pooled memory addresses according to one or more implementations of this disclosure.

FIG. 4 illustrates an exemplary memory map 400 that includes and/or represents a local memory range 416 and/or sharable memory ranges 402(1), 402(2), 402(3), and/or 402(4). In some examples, memory map 400 is distributed and/or provided by system memory manager 110 in FIG. 3 to each of nodes 102(1)-(4). In other examples, memory map 400 is generated, created, and/or built by each of system memory managers 110(1)-(4) in FIG. 2 based at least in part on the memory addresses scanned across nodes 102(1)-(4).

In some examples, local memory range 416 includes and/or represents memory addresses 404(1)-(N). In one example, local memory range 416 is normalized to zero. In other words, memory addresses 404(1)-(N) start at zero and move upward. As a specific example, local memory range 416 can include and/or represent approximately 512 gigabytes of memory and/or data.

In some examples, sharable memory range 402(1) includes and/or represents memory addresses 406(1)-(N). In one example, sharable memory range 402(1) corresponds to and/or is located on memory device 104(1) and/or sharable memory pool 106(1). In this example, sharable memory range 402(1) follows local memory range 416 and/or precedes sharable memory range 402(2) within memory map 400. As a specific example, sharable memory range 402(1) can include and/or represent approximately 512 gigabytes of memory and/or data.

In some examples, sharable memory range 402(2) includes and/or represents memory addresses 408(1)-(N). In one example, sharable memory range 402(2) corresponds to and/or is located on memory device 104(2) and/or sharable memory pool 106(2). In this example, sharable memory range 402(2) follows sharable memory range 402(1) and/or precedes sharable memory range 402(3) within memory map 400. As a specific example, sharable memory range 402(2) can include and/or represent approximately 512 gigabytes of memory and/or data.

In some examples, sharable memory range 402(3) includes and/or represents memory addresses 410(1)-(N). In one example, sharable memory range 402(3) corresponds to and/or is located on memory device 104(3) and/or sharable memory pool 106(3). In this example, sharable memory range 402(3) follows sharable memory range 402(2) and/or precedes sharable memory range 402(4) within memory map 400. As a specific example, sharable memory range 402(3) can include and/or represent approximately 512 gigabytes of memory and/or data.

In some examples, sharable memory range 402(4) includes and/or represents memory addresses 412(1)-(N). In one example, sharable memory range 402(4) corresponds to and/or is located on memory device 104(4) and/or sharable memory pool 106(4). In this example, sharable memory range 402(4) follows sharable memory range 402(3) and/or terminates memory map 400. As a specific example, sharable memory range 402(4) can include and/or represent approximately 512 gigabytes of memory and/or data.

Figure 5:
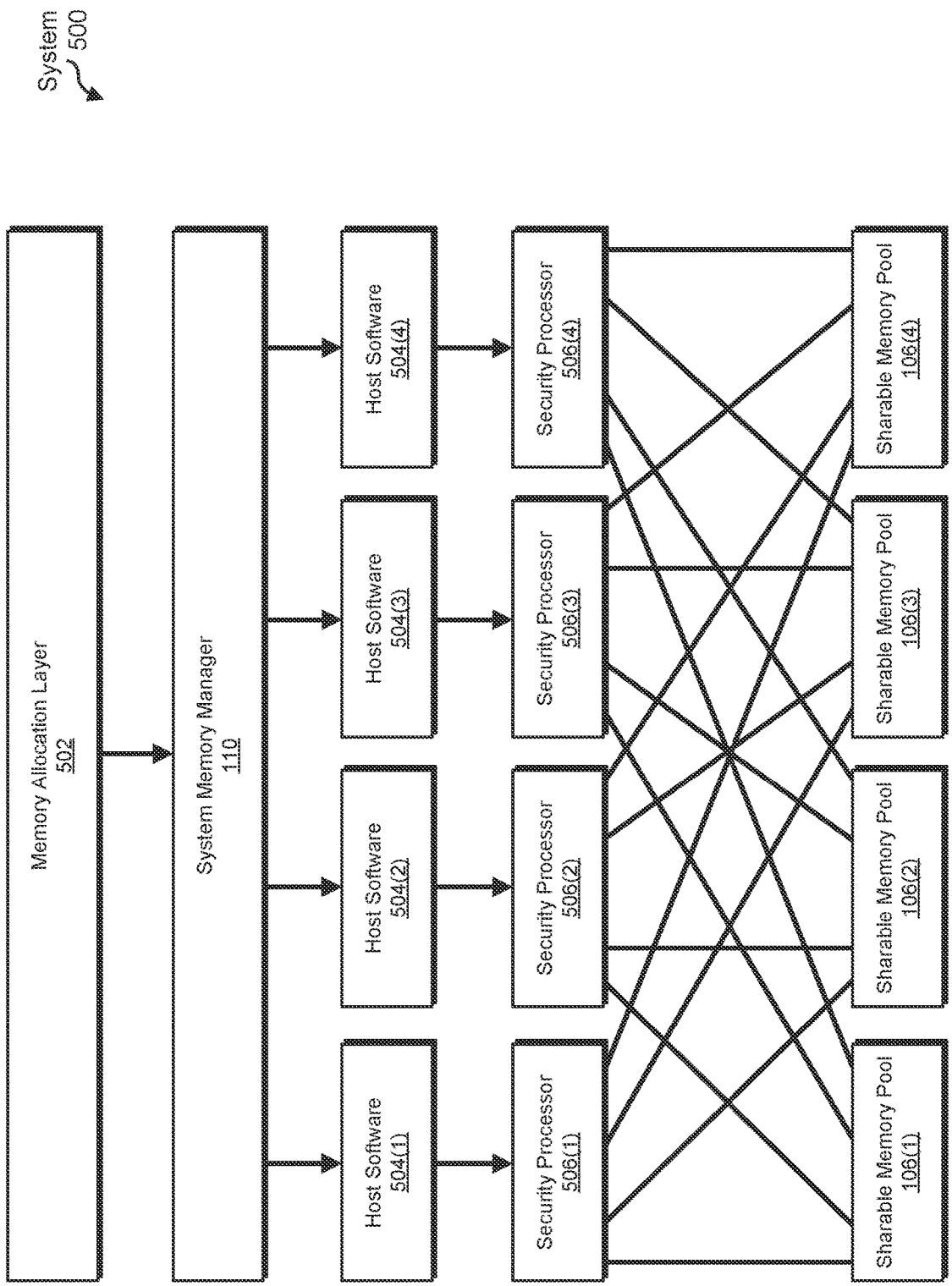
FIG. 5 is an illustration of an exemplary system for sharing memory across clusters of directly connected nodes according to one or more implementations of this disclosure.

FIG. 5 illustrates an exemplary system 500 that includes and/or represents a deconstructed, abstracted, and/or flattened version of a cluster of directly connected nodes capable of sharing memory with one another. In some examples, system 500 can include and/or represent certain components and/or features that perform and/or provide functionalities that are similar and/or identical to those described above in connection with any of FIGS. 1-4. In one example, system 500 includes and/or represents a memory allocation layer 502 that generates and/or communicates new memory allocations per node based at least in part on the needs of applications running on nodes 102(1)-(4) and/or the amount of memory needed by virtual machines running on nodes 102(1)-(4).

In some examples, system 500 also includes and/or represents system memory manager 110 that is communicatively coupled to memory allocation layer 502. In one example, system memory manager 110 can include and/or represent a fabric manager that communicates new memory allocations to host software 504(1), 504(2), 504(3), and 504(4), which correspond to and/or run on nodes 102(1)-(4), respectively. Additionally or alternatively, the fabric manager can adjust and/or modify certain fabric settings.

In some examples, host software 504(1)-(4) can invoke and/or apply hot-add and/or hot-removal features for dynamically increasing and/or reducing the amount of memory allocated to the hosts and/or virtual machines running on nodes 102(1)-(4). In one example, host software 504(1)-(4) can directly invoke and/or direct security processors 506(1), 506(2), 506(3), and/or 506(4), respectively, and/or root of trust (ROT) devices to adjust and/or modify the memory size allocated to the hosts and/or virtual machines. In certain implementations, security processors 506(1)-(4) and/or ROT devices can be used by nodes 102(1)-(4) to secure exclusive access to certain memory ranges in sharable memory pools 106(1)-(4) in a memory fencing scheme.

In some examples, the node and/or system memory manager responsible for lending and/or donating memory to another node in the cluster can enable memory fencing for incoming attempts to access such memory. In such examples, the incoming attempts to access the lent and/or donated memory must hit a specific address range with authorization to be successful and/or fulfilled.

In some examples, the various systems and/or devices described in connection with FIGS. 1-5 can include and/or represent one or more additional components, devices, and/or features that are not necessarily illustrated and/or labeled in FIGS. 1-5. In such examples, one or more of these additional components, devices, and/or features can be inserted and/or applied between any of the components and/or devices illustrated in FIGS. 1-5 consistent with the aims and/or objectives provided herein. Accordingly, one or more of the communicative and/or electrical couplings described with reference to FIGS. 1-5 can be direct connections with no intermediate components, devices, and/or nodes or indirect connections with one or more intermediate components, devices, and/or nodes.

In some examples, the phrase "to couple" and/or the term "coupling", as used herein, can refer to a direct connection and/or an indirect connection. For example, a direct communication coupling between two components can constitute and/or represent a coupling in which those two components are directly connected to each other to provide communication continuity from one of those two components to the other. In other words, the direct coupling can exclude and/or omit any additional components between those two components.

Additionally or alternatively, an indirect communication coupling between two components can constitute and/or represent a coupling in which those two components are indirectly connected to each other through one or more intermediate devices to provide electrical continuity from one of those two components to the other. In other words, the indirect coupling can include and/or incorporate at least one additional component between those two components.

Figure 6:
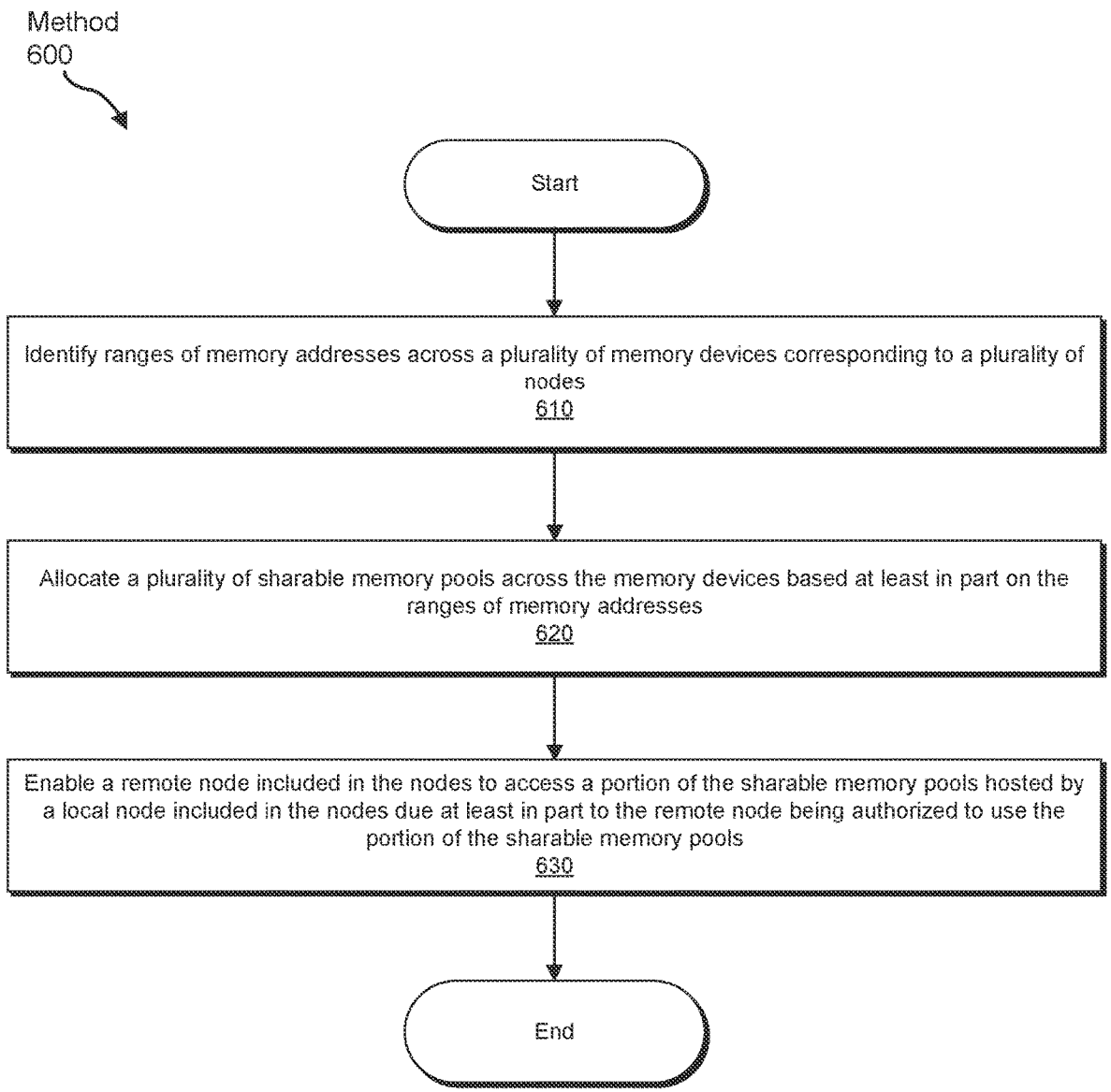
FIG. 6 is a flowchart of an exemplary method for sharing memory across clusters of directly connected nodes according to one or more implementations of this disclosure.

FIG. 6 is a flow diagram of an exemplary method 600 for sharing memory across clusters of directly connected nodes. In one example, the steps shown in FIG. 6 can be performed and/or executed during a process and/or procedure to begin sharing memory across clustered nodes. Additionally or alternatively, the steps shown in FIG. 6 can also incorporate and/or involve various sub-steps and/or variations consistent with the descriptions provided above in connection with FIGS. 1-5.

As illustrated in FIG. 6, exemplary method 600 include and/or involve the step of identify ranges of memory addresses across a plurality of memory devices corresponding to a plurality of nodes (610). Step 610 can be performed in a variety of ways, including any of those described above in connection with FIGS. 1-5. For example, at least one system memory manager identifies ranges of memory addresses across a plurality of memory devices corresponding to a plurality of nodes.

Exemplary method 600 also includes the step of allocating a plurality of sharable memory pools across the memory devices based at least in part on the ranges of memory addresses (620). Step 620 can be performed in a variety of ways, including any of those described above in connection with FIGS. 1-5. For example, the system memory manager allocates a plurality of sharable memory pools across the memory devices based at least in part on the ranges of memory addresses.

Exemplary method 600 further includes the step of enabling a remote node included in the nodes to access a portion of the sharable memory pools hosted by a local node included in the nodes due at least in part to the remote node being authorized to use the portion of the sharable memory pools (630). Step 630 can be performed in a variety of ways, including any of those described above in connection with FIGS. 1-5. For example, the system memory manager enables a remote node included in the nodes to access a portion of the sharable memory pools hosted by a local node included in the nodes due at least in part to the remote node being authorized to use the portion of the sharable memory pools.

While the foregoing disclosure sets forth various implementations using specific block diagrams, flowcharts, and examples, each block diagram component, flowchart step, operation, and/or component described and/or illustrated herein can be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality. Furthermore, the various steps, events, and/or features performed by such components should be considered exemplary in nature since many alternatives and/or variations can be implemented to achieve the same functionality within the scope of this disclosure.

The devices, systems, and methods described herein can employ any number of software, firmware, and/or hardware configurations. For example, one or more of the exemplary implementations disclosed herein can be encoded as a computer program (also referred to as computer software, software applications, computer-readable instructions, and/or computer control logic) on a computer-readable medium. In one example, when executed by at least one processor, the encodings of the computer-readable medium cause the processor to generate and/or produce a computer-readable representation of an integrated circuit configured to do, perform, and/or execute any of the tasks, features, and/or actions described herein in connection with FIGS. 1-6. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and/or other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the instant disclosure. The implementations disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a cluster of computing devices that are communicatively coupled to one another via at least one direct link and include a plurality of memory devices, wherein each of the computing devices includes at least one of the memory devices; and
   at least one system memory manager communicatively coupled to the cluster of computing devices, the system memory manager configured to:
      allocate a plurality of sharable memory pools across the memory devices;
      detect an addition of a memory device to the plurality of memory devices or a removal of a memory device from the plurality of memory devices during operation of the computing devices; and
      reallocate the sharable memory pools across the memory devices to account for the addition or removal of the memory device during operation of the computing devices.

2. The system of claim 1, wherein the system memory manager is configured to:

identify workloads of the computing devices; and
allocate the sharable memory pools across the memory devices based at least in part on the workloads of the computing devices.

3. The system of claim 2, wherein the system memory manager is configured to reserve at least a portion of the sharable memory pools for exclusive use by a first computing device included in the computing devices.

4. The system of claim 1, wherein:
a first computing device included in the computing devices hosts a sharable memory pool included in the sharable memory pools; and
a second computing device included in the computing devices is configured to access, via the direct link, at least a portion of the sharable memory pool in connection with at least one application running on the second computing device due at least in part to the second computing device being authorized to use the portion of the sharable memory pool.

5. The system of claim 4, wherein a third computing device included in the computing devices is configured to access the sharable memory pool in connection with an additional application running on the third computing device.

6. The system of claim 4, wherein:
a third computing device included in the computing devices hosts an additional sharable memory pool included in the sharable memory pools; and
the second computing device is configured to access at least a portion of the additional sharable memory pool in connection with the application running on the second computing device due at least in part to the second computing device being authorized to use the portion of the additional sharable memory pool.

7. The system of claim 1, wherein the system memory manager is configured to generate at least one memory map that includes address ranges corresponding to the sharable memory pools to enable the computing devices to access the sharable memory pools.

8. The system of claim 7, wherein:
the computing devices each include private local memory that is inaccessible to one another; and
the system memory manager is configured to generate the memory map to include an address range corresponding to the private local memory normalized across the computing devices.

9. The system of claim 1, wherein the direct link that communicatively couples the computing devices to one another comprises a physical communication link that excludes switches between the computing devices.

10. The system of claim 1, wherein the system memory manager is configured to:
receive a memory management request from a remote device; and
increase or decrease an amount of memory that is allocated to at least one of the sharable memory pools in response to the memory management request.

11. The system of claim 1, wherein the system memory manager is configured to detect the addition or removal of the memory device via an advanced configuration and power interface (ACPI).

12. The system of claim 1, wherein the computing devices comprise security processors configured to implement memory fencing across the sharable memory pools to ensure that unauthorized attempts to access any of the sharable memory pools are denied.

13. The system of claim 1, wherein the system memory manager comprises a plurality of system memory controllers that are implemented by the computing devices and communicate with one another to coordinate the allocation of the sharable memory pools.

14. The system of claim 13, wherein the computing devices are configured to:
scan the memory devices for address ranges to broadcast to one another; and
build memory maps based at least in part on the address ranges broadcasted to one another.

15. The system of claim 1, wherein the system memory manager comprises a centralized memory manager that manages the sharable memory pools.

16. A method comprising:
identifying, by at least one system memory manager, ranges of memory addresses across a plurality of memory devices corresponding to a cluster of computing devices, wherein each of the computing devices includes at least one of the memory devices;
allocating, by the system memory manager, a plurality of sharable memory pools across the memory devices based at least in part on the ranges of memory addresses;
detecting, by the system memory manager, an addition of a memory device to the plurality of memory devices or a removal of a memory device from the plurality of memory devices during operation of the computing devices;
reallocating, by the system memory manager, the sharable memory pools across the memory devices to account for the addition or removal of the memory device during operation of the computing devices; and
enabling, by the system memory manager, a remote computing device included in the computing devices to access a portion of the sharable memory pools hosted by a local node included in the computing devices due at least in part to the remote computing device being authorized to use the portion of the sharable memory pools.

17. A non-transitory computer-readable medium comprising one or more computer-executable instructions that, when executed by at least one processing device that implements at least one system memory manager, cause the system memory manager to:
identify ranges of memory addresses across a plurality of memory devices corresponding to a cluster of computing devices, wherein each of the computing devices includes at least one of the memory devices;
allocate a plurality of sharable memory pools across the memory devices based at least in part on the ranges of memory addresses;
detect an addition of a memory device to the plurality of memory devices or a removal of a memory device from the plurality of memory devices during operation of the computing devices;
reallocate the sharable memory pools across the memory devices to account for the addition or removal of the memory device during operation of the computing devices; and
enable a remote computing device included in the computing devices to access a portion of the sharable memory pools hosted by a local computing device included in the computing devices due at least in part to the remote computing device being authorized to use the portion of the sharable memory pools.

18. The system of claim 1, wherein each of the memory devices hosts at least one of the sharable memory pools.

\* \* \* \* \*